United States Patent [19]

Kurz

[11] Patent Number: 5,045,255
[45] Date of Patent: Sep. 3, 1991

[54] METHOD FOR CONTINUOUSLY FORMING OPEN-MOUTHED FOAMED PLASTIC CONTAINERS BY BLOW MOLDING TECHNIQUES

[75] Inventor: John H. Kurz, Scottsdale, Ariz.

[73] Assignee: Scott Paper Comany, Philadelphia, Pa.

[21] Appl. No.: 608,581

[22] Filed: Oct. 30, 1990

Related U.S. Application Data

[63] Continuation of Ser. No. 366,562, Jun. 15, 1989, abandoned.

[51] Int. Cl.$^5$ .................. B29C 49/04; B29C 49/38
[52] U.S. Cl. .................................. 264/51; 264/46.1; 264/151; 264/159; 264/527; 264/536; 264/543; 264/DIG. 1; 425/527; 425/539
[58] Field of Search .............. 264/543, 51, 542, 536, 264/527, 529, DIG. 1, 46.1, 151, 159; 425/527, 539, 540

[56] References Cited

U.S. PATENT DOCUMENTS

| | | | |
|---|---|---|---|
| 2,541,249 | 2/1951 | Hobson | 264/527 |
| 2,991,500 | 7/1961 | Hagen | 425/527 |
| 3,035,302 | 5/1962 | Lysobey | 264/542 |
| 3,456,290 | 7/1969 | Ruekberg | 264/527 |
| 3,804,573 | 4/1974 | De Piero | 425/540 |
| 3,901,958 | 8/1975 | Doll | 264/536 |
| 3,939,236 | 2/1976 | Hahn | 264/536 |
| 4,115,491 | 9/1978 | Hanning | 264/DIG. 1 |
| 4,213,750 | 7/1980 | Kubota et al. | 264/536 |
| 4,550,009 | 10/1985 | Burkel | 264/536 |
| 4,874,649 | 10/1989 | Daubenbuechel et al. | 264/DIG. 1 |
| 4,988,279 | 1/1991 | Belcher | 425/539 |

FOREIGN PATENT DOCUMENTS

| | | | |
|---|---|---|---|
| 757782 | 4/1971 | Belgium | 425/527 |
| 38-11832 | 7/1963 | Japan | 264/527 |

Primary Examiner—Jan H. Silbaugh
Assistant Examiner—Catherine Timm
Attorney, Agent, or Firm—Mark G. Bocchetti; John W. Kane, Jr.; Paul R. Wylie

[57] ABSTRACT

A foamable plastic material is introduced to an extruder to produce a tubular parison of the material that is subsequently clamped between mold halves moving both axially and radially inwardly to form cavities for open mounted containers. Cavities for two containers are provided with each set of mold haves clamped together aorund the parison at the middle of the mold set to provide individual container cavities extending on either side of the clamped portion, said individual cavities terminating in the mouth portion of the container cavity which is joined in a mouth to mouth relationship with an individual container cavity of the next set of mold halves. A portion of the molten plastic material can be removed from the parison extruder at a point upstream from the point of introduction of a foaming agent and routed to the extrusion head where it is coextruded with the material containing foaming agent thus resulting in a coextruded parison having an outer layer of plastic material that contains no foaming agent and an inner layer of the same plastic material that contains a foaming agent. The resulting product is one where the outer layer provides a smooth and glossy surface finish of unfoamed plastic material to the container comprised mainly of foamed plastic material.

4 Claims, 3 Drawing Sheets

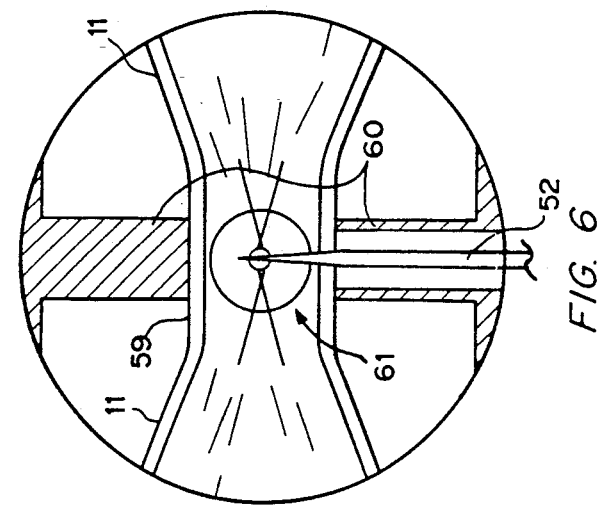
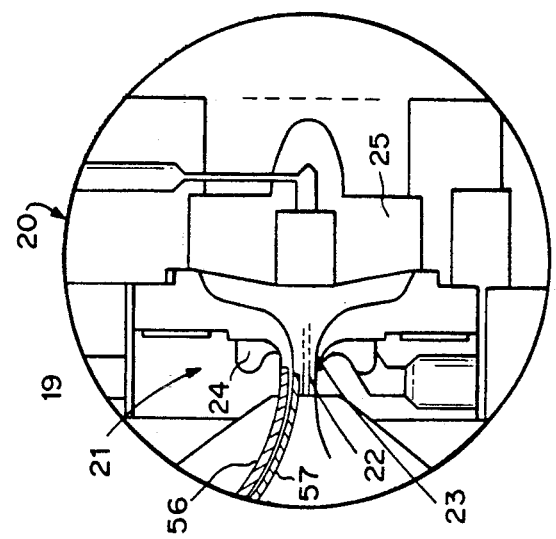
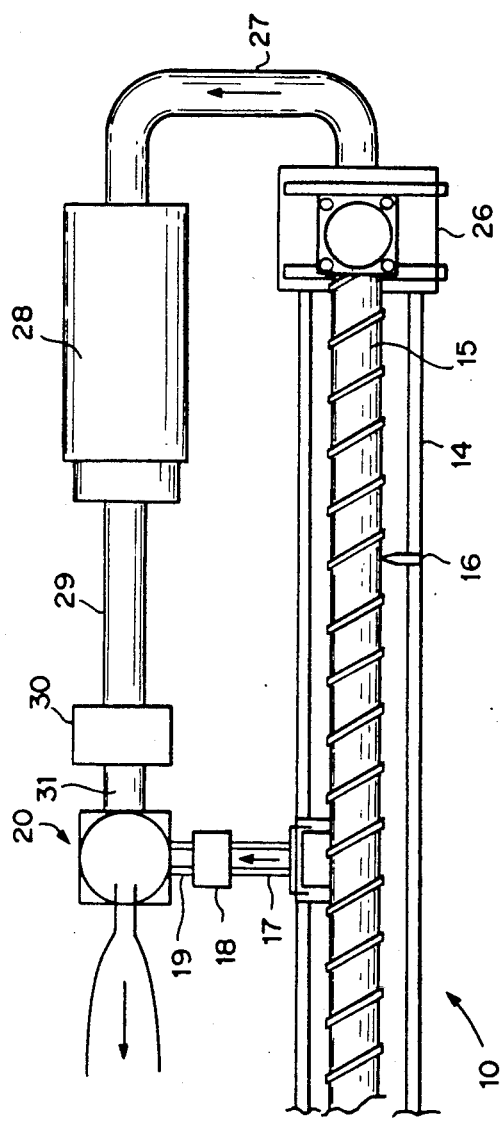
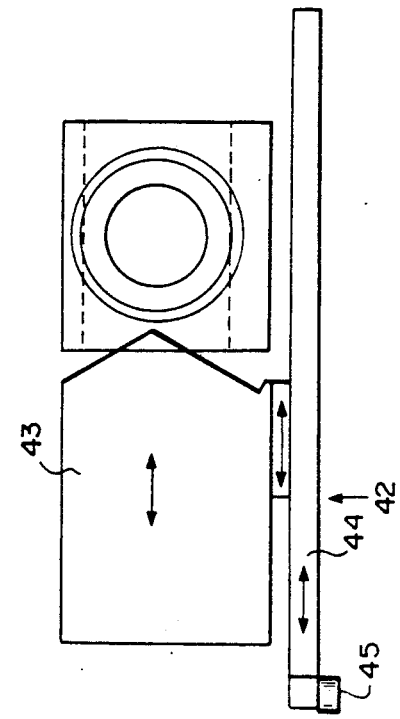
FIG. 3
FIG. 5
FIG. 6
FIG. 4

METHOD FOR CONTINUOUSLY FORMING OPEN-MOUTHED FOAMED PLASTIC CONTAINERS BY BLOW MOLDING TECHNIQUES

This application is a continuation of application Ser. No. 07/366,562, filed June 15, 1989, now abandoned.

This invention relates generally to novel manufacturing techniques for the formation of plastic containers such as, for example, beverage cups of the type that are formed of foamed plastic materials. Such containers typically have open mouths and tapering side walls extending to a planar base portion. More particularly, the invention relates to a method and apparatus for the formation of such containers wherein the containers can be formed while enclosed in continuously moving molds.

BACKGROUND OF THE INVENTION

Most containers made of foamed polystyrene materials are currently manufactured by steam chest molding techniques wherein expandable polystyrene beads are introduced into a closed mold cavity and expanded by means of hot steam introduced into the mold cavity. A foamed polystyrene container results having the contours of the cavity. While this conventional foamed container manufacturing method has been successfully used for containers of all sizes, it does have drawbacks in that the molds and equipments are expensive and the cycle time of the molds is dependent upon the time required to expand the beads in the mold cavity and the mold cool down time.

There have been several attempts to develop methods and apparatus for continuously forming foamed plastic containers by using apparatus other than the aforementioned steam chest molding apparatus. These include, the methods shown in U.S. Pat. No. 4,028,034 to Hahn and U.S. Pat. No. 3,225,127 to Scott. Both of these prior art patents disclose extrusion of an expandable foam parison that is subsequently blow molded to form containers. However, the patent to Hahn relies on a quadrasectional mold that is not well adapted to continuous processing. The patent to Scott addresses only the formation of bottles of the type having a small neck (as opposed to a wide mouth) with the neck being molded to form a high tolerance neck finish simultaneously with the blowing of the parison.

According to applicants invention, there is provided a method and apparatus for continuously forming thin walled open mouthed foamed plastic containers by blow molding techniques that provide both speed and reliability.

The basic technique of the invention includes introducing a foamable plastic material to an extruder to produce a tubular parison of the material that is subsequently clamped between mold halves moving both axially and radially inwardly to form cavities for open mouthed containers. According to a preferred form of the invention, cavities for two containers are provided in each set of mold halves which are clamped together around the parison at the middle of the mold set to provide individual container cavities extending on either side of the clamped portion, said individual cavities terminating in the mouth portion of the container cavity which is joined in a mouth to mouth relationship with an individual container cavity of the next set of mold halves. A blowing gas is inserted into the thus clamped parison to expand it into the mold cavities to assume the shape thereof and to form on a continuous basis sets of two containers joined together in mouth to mouth relationship with containers formed in the cavities of the adjacent mold sets.

According to a feature of the invention, the containers thus formed are severed while still in the mold by passing a cutting and severing means through the plastic material that joins said containers in mouth to mouth relationship. The mold halves are then moved radially apart to permit removal of the containers thus formed.

According to another feature of the invention, there is provided a method and apparatus for extruding a parison, wherein a portion of the molten plastic material is removed from the extruder at a point upstream from the point of introduction of a foaming agent for the plastic material. The portion removed is then routed to the extrusion head where it is coextruded with the material containing foaming agent thus resulting in a coextruded parison having an outer layer of plastic material that contains no foaming agent and an inner layer of the same plastic material that contains a foaming agent. The resulting product is one where the outer layer provides a smooth and glossy surface finish of unfoamed plastic material to the container comprised mainly of foamed plastic material.

It was an object of the invention to provide a continuous blow molding method wherein foamed plastic open mouthed plastic containers could be formed.

It was another object of applicants invention to provide a method of forming foamed open mouthed plastic containers on an end to end basis and to provide a means for severing such containers to provide a clean cut on the open mouth portions thereof.

It was a further object of the invention to provide a smooth and glossy surface finish on such containers.

These and other objects of the invention will be apparent from the drawings and the following description thereof.

IN THE DRAWINGS

FIG. 3 is a schematic plan view of the extrusion apparatus according to the invention;

FIG. 4 is an end elevation view of a container cutting and severing mechanism of the molding apparatus of FIG. 2;

FIG. 5 is an enlarged sectional view taken on line 5—5 of FIG. 1 showing details of the extrusion apparatus of the invention; and, FIG. 6 is a sectional view taken on line 6—6 of FIG. 2.

DETAIL DESCRIPTION OF THE INVENTION

Figure 1:
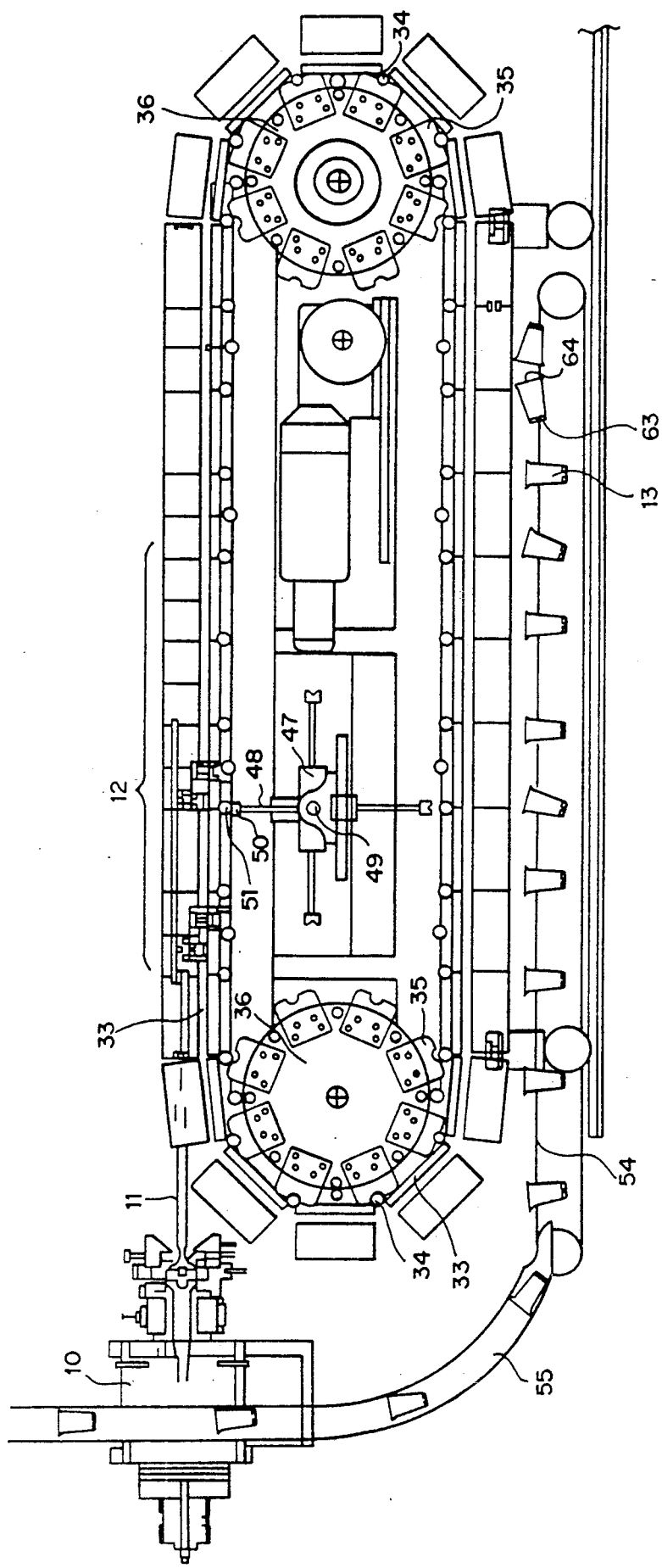
FIG. 1 is a schematic side elevation of the extrusion and molding apparatus according to the invention.

Referring to the drawings, which describe a specific embodiment of the invention, there is shown in FIG. 1 an extruder 10 for forming a parison 11 and a molding apparatus 12 which forms, from the parison 11, open mouthed containers 13.

FIG. 3, shows details of the extruder 10 according to the invention. The extruder includes barrel 14 and screw 15. A foaming agent inlet 16 is provided along the length of the barrel 14. Upstream from foaming agent inlet 16 is takeoff conduit 17, pump 18 and transfer conduit 19.

Extrusion head 20 is shown in more detail in FIG. 5 wherein coextrusion die 21 includes a primary extrusion passage 22 and an external extrusion passage 23. Manifold 24 connects to external extrusion passage 23 and is in fluid communication with transfer conduit 19. Primary extrusion passage 22 is in communication with distributor 25.

At the downstream end of barrel 14 is provided a screen changer 26 that is connected by conduit 27 to cooler 28 which in turn is connected by conduit 29 to melt pump 30 and then by conduit 31 to extrusion head 20.

Referring again to FIG. 1, molding apparatus 12 includes mold sets 32 which are connected to conveyor belt 33. The conveyor belt 33 includes sprockets 34 adapted to mate with sprocket drives 35 which are mounted on drive wheels 36.

Figure 2:
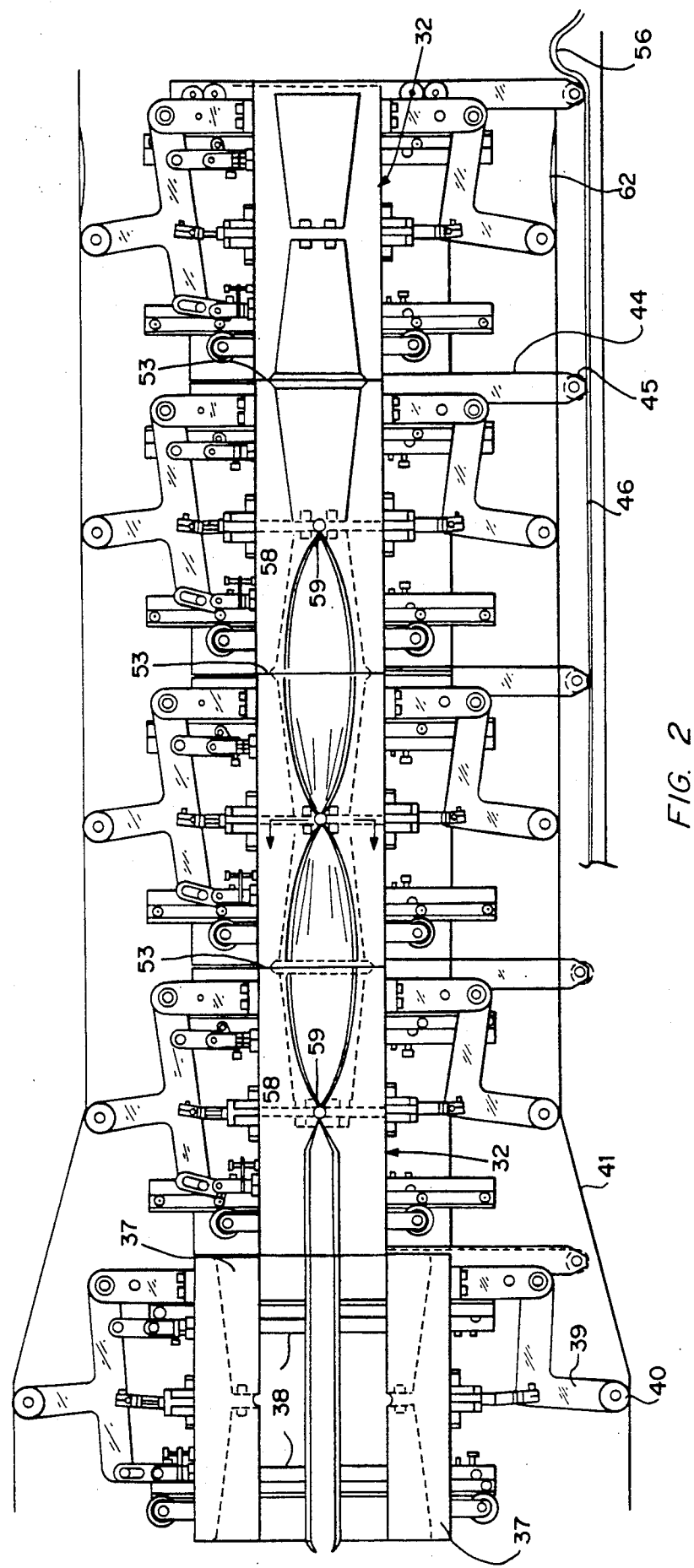
FIG. 2 is a top plan schematic view of the molding apparatus utilized according to the invention and showing the initial molding of the parison.

As best seen in FIG. 2, mold sets 32 are comprised of halves 37. Each mold halve 37 is connected to slides 38 upon which they reciprocate from a closed position to an open position. To each mold halve 37 is connected a cam follower mechanism 39 which includes a cam roller 40 adapted to follow a first cam track 41. Each mold set 32 has associated with it a knife mechanism 42 as shown in FIG. 4 which includes a knife blade 43. Each knife mechanism 42 includes a cam follower attachment 44 carrying a cam roller 45 which follows a second cam track 46.

Referring again to FIG. 1, blowing mechanism 47 include blowing gas transmission arms 48 that are mounted for rotation on pin 49. Each of the blowing gas transmission arms 49 are fluidly connected to a source of blowing gas (not shown). At the end of blowing transmission arms 49 are concave fluid coupling members 50 which mate with convex fluid coupling members 51 which are in turn attached to blowing needles 52.

Each of the mold sets 32 are separated from the adjacent mold set 32 by a space 53 of a uniform width only sufficient to allow the passage of knife 43 therethrough.

Molding apparatus 12 further includes a takeoff conveyor 54 (shown schematically) to convey containers 13 to pneumatic elevator 55.

Second cam track 46 includes cam actuation projection 56 for the purpose of forcing the cam follower attachment 44 and knife blade 43 inwardly.

In operation, plastic material, such as for example, foamable polystyrene is introduced to extruder 10. The foamable polystyrene material can be expanded foamed to a reduced density by introducing a blowing agent to the material. The foamable material is advanced along the length of barrel 14 by screw 15. At a point upstream from the point of introduction of the blowing agent at blowing agent inlet 16, a portion of the plastic material without blowing agent is removed from barrel 14 at takeoff conduit 17. The removed portion is forced by pump 18 through return conduit 19 and into extrusion head 20 to become a secondary extrudate 56, as shown in FIG. 5. The remainder of the material in extruder 10 advances down the length of barrel 14, through screen changer 26 and cooler 28 into melt pump 30, and then into extrusion head 20 where it becomes the primary extrudate 57.

The primary extrudate material 57 coming from melt pump 30 is divided by distributor 25 and passes through primary extrusion passage 22 of coextrusion die 21. Such material contains the blowing agent that was added at blowing agent inlet 16 in barrel 14 during the extrusion process. The secondary extrudate material 56 passes into manifold 24 and through external extrusion passage 23 to be deposited on the outside of primary extrudate material 57 as such materials are coextruded to form a double layered parison 11. The resulting parison 11, coming out of extrusion die 21 has an internal layer 57 of foamed plastic material containing a blowing agent and an external layer 56 of plastic material that does not contain blowing agent. The result is a parison with an expandable layer 57 and a more dense layer of plastic material 56 on the outside. This results in containers 13 from the process having a denser, smoother surface finish.

Parison 11 passes out of extruder 10 into molding apparatus 12 where it is captured by closing mold sets 32, the halves 37 of which close to form molding cavities 58. The closing of mold sets 32 also pinches off the ends 59 of the parison 11 by means of restricting members 60 in the molds. At that point, blowing needle 52, activated by blowing mechanism 47, is forced into the space 61 between the restrictions 60 and blowing air is introduced to expand the parison 11 to take on the contours of cavity 58 of the mold sets 32.

Restrictions 60 then cuts off a portion of the parison 11 clamped there-between by action of cam roller 40 being pressed further inwardly by cam actuation projection 62 of first cam track 41 whereby restriction 60 moves together to cut the parison 11 thus freeing the closed ends 63 of the containers 13 formed in cavity 58.

As shown in FIG. 2, knife mechanism 42, is operated by cam roller 45 and cam actuation projection 56 following second cam track 46 to project knife blade 43 inwardly in the space 53 between adjacent mold sets 32. The knife blade 43, thus projected, cuts the containers 13 apart cleanly at the respective intersection of their open mouth extremities 64. As previously described, the knife blade moves through a space between the molds of only sufficient width to permit its passage. The blowing air is maintained at sufficient pressure to rigidly hold the parison against the walls of the cavity to facilitate the passing of the blade to sever the containers. Air escaping along the knife blade serves as a lubricant therefor.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A method of continuously forming thin walled, foamed plastic containers by a blow molding method comprising the following steps:
    (a) introducing foamable plastic material to an extruder;
    (b) extruding said material through an orifice to form a tubular parison;
    (c) passing the parison into a molding apparatus which includes a plurality of mold sets moving on a continuous conveyor, each of said mold sets including two mold halves which when clamped together form two container molds adjacent to one another in closed-end to closed-end relationship.

said mold sets abutting one another to form a series of cavities, each cavity in the shape of two containers abutting one another in mouth-to-mouth relationship;
(d) closing adjacent mold sets in sequence such that any three adjacent mold sets form two complete molding cavities; and
(e) pinching said parison with restriction members located substantially at the mid-point of each mold set, said restriction members having a small space therebetween;
(f) blowing gas through a needle extending into the second of said three mold sets to said small space between said restriction members thereby expanding the parison to take on the contours of the two complete molding cavities and thereby forming two pairs of containers joined in mouth-to-mouth relationship;
(g) further closing the restriction members to substantially eliminate said small space;
(h) severing said containers without a cooling step by passing a cutting means through the plastic material joining said containers in mouth-to-mouth relationship while said mold sets are closed;
(i) continuing to maintain gas in said containers during said severing step to hold the containers against the walls of the cavities to facilitate the passing of the cutting means to sever said material joining said containers; and
(j) opening said molds sets to permit the containers to be removed therefrom.

2. The method according to claim 1 wherein a space is provided between said adjacent mold sets is of only sufficient width to permit the passage of a cutting knife.

3. The method according to claim 2 wherein said space permits the escape of said expanding gas along said knife edge to serve as a lubricant therefor.

4. A method for continuously forming thin walled, foamed plastic containers by blow molding method as recited in claim 1 further comprising:
substantially continuously performing steps (a) through (j) such that said blowing step is repeated on every other one of said mold sets.

* * * * *